(12) United States Patent
Kiyonaga et al.

(10) Patent No.: US 9,940,958 B1
(45) Date of Patent: Apr. 10, 2018

(54) DATA STORAGE DEVICE EMPLOYING DELAYED BRAKING TO UNLOAD MULTIPLE VOICE COIL MOTORS

(71) Applicant: Western Digital Technologies, Inc., Irvine, CA (US)

(72) Inventors: Toshihisa Kiyonaga, San Jose, CA (US); Peng Huang, Lake Forest, CA (US); Brian K. Tanner, San Jose, CA (US); Paolo Capretta, Aliso Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/805,299

(22) Filed: Nov. 7, 2017

(51) Int. Cl.
   *G11B 5/09*    (2006.01)
   *G11B 5/55*    (2006.01)
   *G11B 19/20*   (2006.01)
   *G11B 5/48*    (2006.01)

(52) U.S. Cl.
   CPC ............ *G11B 5/5582* (2013.01); *G11B 5/488* (2013.01); *G11B 19/2009* (2013.01)

(58) Field of Classification Search
   None
   See application file for complete search history.

(56) References Cited

U.S. PATENT DOCUMENTS

| | | | | |
|---|---|---|---|---|
| 5,261,058 A | * | 11/1993 | Squires | G06F 3/0601 360/78.12 |
| 5,604,719 A | * | 2/1997 | Kakimoto | G11B 11/10502 369/13.21 |
| 5,822,281 A | * | 10/1998 | Yumita | G11B 7/08529 369/13.32 |
| 6,005,747 A | * | 12/1999 | Gilovich | G11B 5/54 360/98.07 |
| 6,121,742 A | | 9/2000 | Misso | |
| 6,282,049 B1 | * | 8/2001 | Cameron | G11B 5/54 360/75 |
| 6,512,650 B1 | * | 1/2003 | Tanner | G11B 5/54 360/69 |
| 6,577,465 B1 | | 6/2003 | Bennett et al. | |
| 6,847,504 B1 | | 1/2005 | Bennett et al. | |
| 6,934,135 B1 | | 8/2005 | Ryan | |
| 6,970,319 B1 | | 11/2005 | Bennett et al. | |
| 6,987,639 B1 | * | 1/2006 | Yu | G11B 5/5526 360/78.04 |
| 7,548,392 B1 | | 6/2009 | Desai et al. | |
| 9,165,583 B1 | | 10/2015 | Beker | |
| 2001/0030826 A1 | * | 10/2001 | Thia | G11B 5/59611 360/69 |

(Continued)

*Primary Examiner* — Peter Vincent Agustin

(57) ABSTRACT

A data storage device is disclosed wherein multiple voice coil motors (VCMs) are unloaded using a back electromotive force (BEMF) voltage generated by a spindle motor. A velocity and position of each VCM is measured, and a priority assigned to each VCM based on the measured velocity and position. During a delay interval, the BEMF voltage is used to apply a first brake voltage to a high priority VCM and to apply a second brake voltage to a low priority VCM, wherein the second brake voltage is lower than the first brake voltage. After the delay interval, the BEMF voltage is used to apply the first brake voltage to the high priority VCM and to apply a third brake voltage to the low priority VCM, wherein the third brake voltage is higher than the second brake voltage.

20 Claims, 7 Drawing Sheets

(56) References Cited

U.S. PATENT DOCUMENTS

| | | | |
|---|---|---|---|
| 2004/0080858 A1* | 4/2004 | Suzuki | G11B 5/54 360/75 |
| 2006/0056099 A1* | 3/2006 | Hashimoto | G11B 5/59633 360/75 |
| 2010/0067138 A1* | 3/2010 | Ooi | G11B 5/54 360/71 |

* cited by examiner

DATA STORAGE DEVICE EMPLOYING DELAYED BRAKING TO UNLOAD MULTIPLE VOICE COIL MOTORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
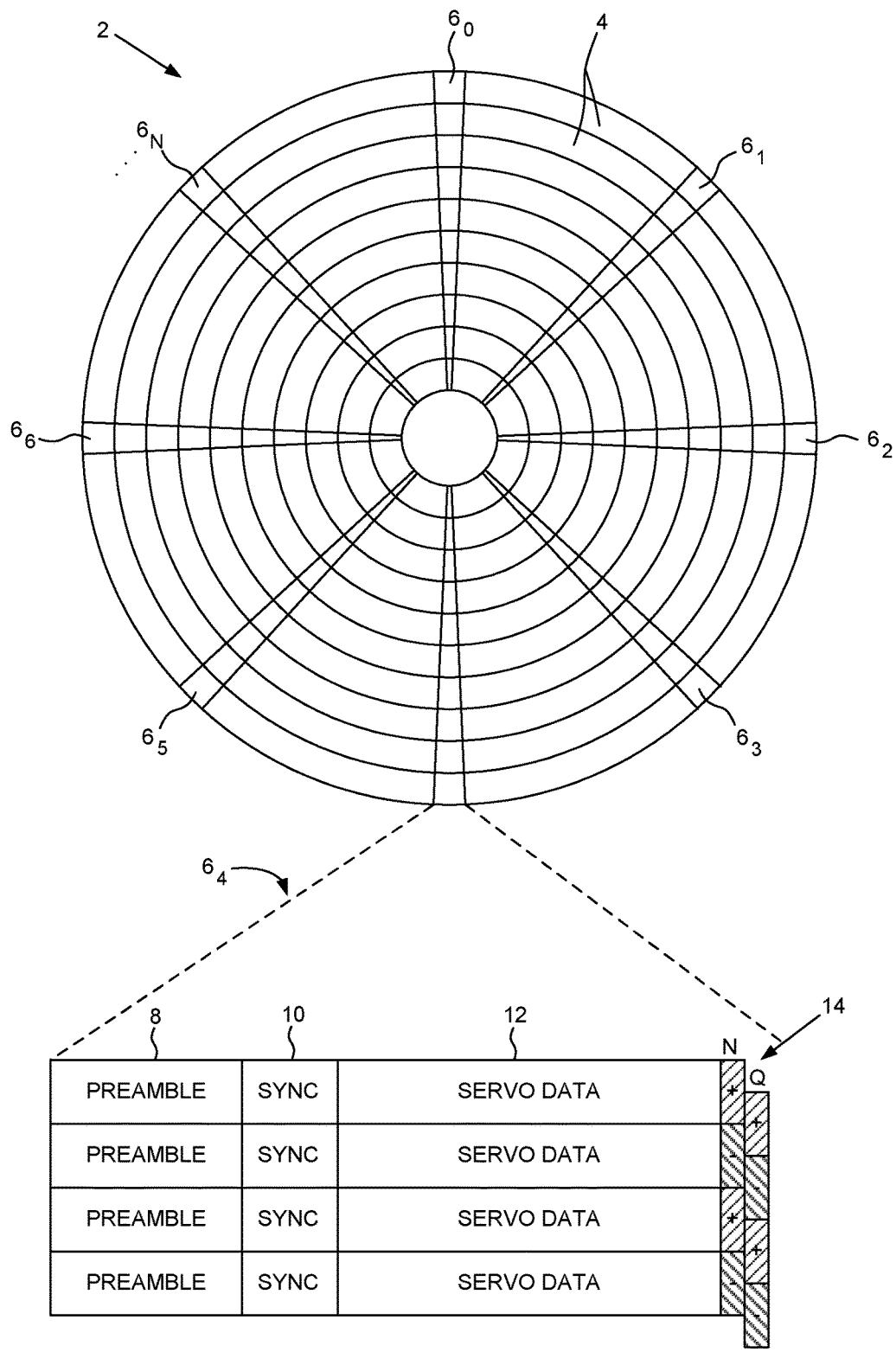
FIG. 1 shows a prior art disk format comprising a plurality of servo tracks defined by servo sectors.
Figure 2:
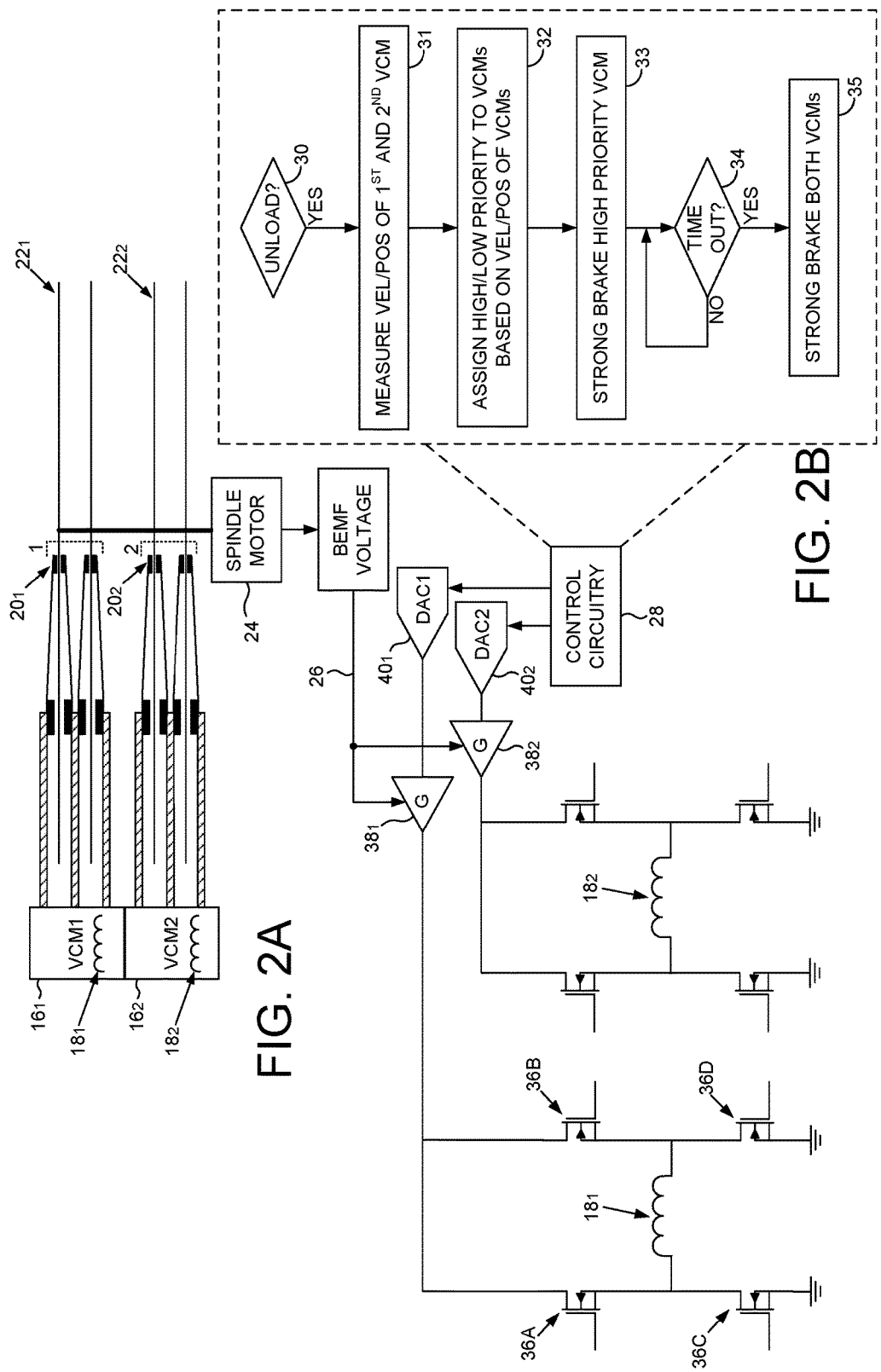
FIG. 2A shows a data storage device in the form of a disk drive according to an embodiment comprising a first head actuated over a first disk by a first VCM, and a second head actuated over a second disk by a second VCM, wherein the disks are rotated by a spindle motor configured to generate a back electromotive force (BEMF) voltage during a power failure.
FIG. 2B is a flow diagram according to an embodiment wherein during a power failure the VCMs are unloaded by immediately braking a high priority VCM and delay braking a low priority VCM.

FIG. 2A shows a data storage device in the form of a disk drive according to an embodiment comprising a first voice coil motor (VCM) $16_1$ comprising a first voice coil $18_1$ configured to actuate a first head $20_1$ over a first disk $22_1$, and a second VCM $16_2$ comprising a second voice coil $18_2$ configured to actuate a second head $20_2$ over a second disk $22_2$. The disk drive further comprises a spindle motor 24 configured to rotate the first and second disk $22_1$ and $22_2$, wherein during a power failure the kinetic rotation of the first and second disks $22_1$ and $22_2$ causes the spindle motor to generate a back electromotive force (BEMF) voltage 26. Control circuitry 28 is configured to unload the first VCM and the second VCM during the power failure (block 30) by executing the flow diagram of FIG. 2B, wherein a first velocity and a first position of the first VCM and a second velocity and a second position of the second VCM are measured (block 31). A high priority is assigned to one of the VCMs and a low priority to one of the VCMs based on the first velocity, first position, second velocity and second position (block 32). During a delay interval, the BEMF voltage is used to apply a first brake voltage to the voice coil of the high priority VCM and to apply a second brake voltage to the voice coil of the low priority VCM, wherein the second brake voltage is lower than the first brake voltage (block 33). After the delay interval (block 34), the BEMF voltage is used to apply the first brake voltage to the voice coil of the high priority VCM and to apply a third brake voltage to the voice coil of the low priority VCM (block 35), wherein the third brake voltage is higher than the second brake voltage.

Any suitable values may be selected for the first, second, and third brake voltages in the flow diagram of FIG. 2B. In one embodiment, the second brake voltage is zero, and in another embodiment the second brake voltage is in the range of zero and 40 percent of the first brake voltage. In one embodiment, the third brake voltage is in the range of 50 and 100 percent of the first brake voltage.

In one embodiment, the current sourced from the BEMF voltage of the spindle motor is limited which limits the amount of braking power available during a power failure. If the brake voltage simultaneously applied to both voice coils is capped to avoid exceeding the current limit of the BEMF voltage, the resulting braking power may not be sufficient to slow the heads before contacting a ramp at the outer diameter (OD) of the disk, which can eventually damage the heads after executing numerous unload operations. That is, if a power failure occurs while one of the heads is near the OD of the disk and moving at a high velocity toward the OD, a capped brake voltage may be insufficient to slow the head before contacting the ramp. Accordingly in one embodiment, delaying the brake voltage of a low priority head as determined by the initial velocity and position of the VCM at the beginning of a power failure helps prevent damaging the heads by applying more braking power to a head that is at the OD of the disk and moving at a high velocity toward the ramp. In one embodiment, this reduces the number of times any one head contacts the ramp at an excessive velocity since it is statistically less likely that both heads will be at the OD and travelling at a high velocity toward the ramp at the beginning of a power failure.

In the embodiment of FIG. 2A, the first VCM $16_1$ and the second VCM $16_2$ rotate respective actuator arms about a common pivot in what may be referred to as a split actuator design. In another embodiment, the first VCM and the second VCM may be separated so as to rotate respective actuator arms about independent pivots. Also in the embodiment of FIG. 2A, the disk drive comprises four disks having respective heads actuated over top and bottom disk surfaces. Other embodiments may employ a different number of head/disk combinations, and still other embodiment may employ more than two VCMs for independent actuation of one or more heads.

In the embodiment of FIG. 2A, each voice coil $18_1$ and $18_2$ is driven by an H-bridge circuit comprising a plurality of switches (e.g., switches 36A, 36B, 36C and 36D). The switches are configured by the control circuitry 28 in order to rotate the VCM in on direction or the other, thereby actuating the respective heads toward the outer diameter or inner diameter of the disk. For example, when switches 36B and 36C are turned on and switches 36A and 36D are turned off, the VCM1 may be rotated so that the heads 1 move toward the outer diameter of the disk $22_1$ toward a ramp (not shown). When a power failure occurs while the disks are spinning, the kinetic energy of the spinning disks can convert the spindle motor 24 into a power generator used to power the VCM H-bridge circuits using the BEMF voltage that builds across the windings of the spindle motor 24.

Figure 3:
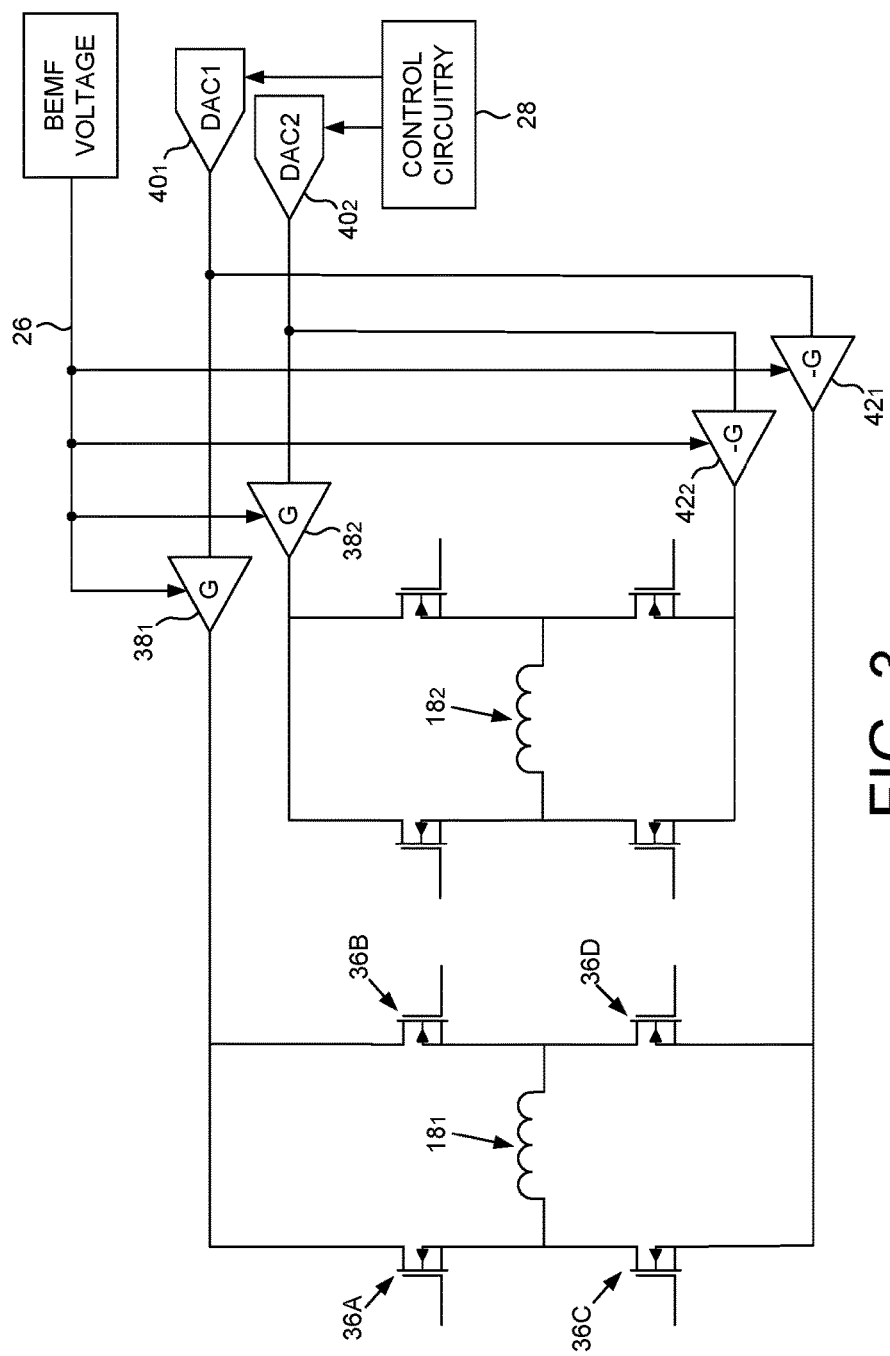
FIG. 3 shows an embodiment wherein the brake voltage is applied to each VCM as a differential voltage using a non-inverting and inverting amplifier.

In the embodiment of FIG. 2A, the brake voltage is applied to each voice coil using respective non-inverting amplifiers $38_1$ and $38_2$ powered by the BEMF voltage 26. The control circuitry 28 loads digital values representing the brake voltage for each VCM into respective digital-to-analog converters (DACs) $40_1$ and $40_2$ which convert the digital values to analog values applied to the non-inverting amplifiers $38_1$ and $38_2$. FIG. 3 shows an embodiment wherein the brake voltage may be applied to each voice coil as a differential voltage by connecting the low side switches of the H-bridge circuits to inverting amplifiers $42_1$ and $42_2$ powered by the BEMF voltage 26.

Figure 4:
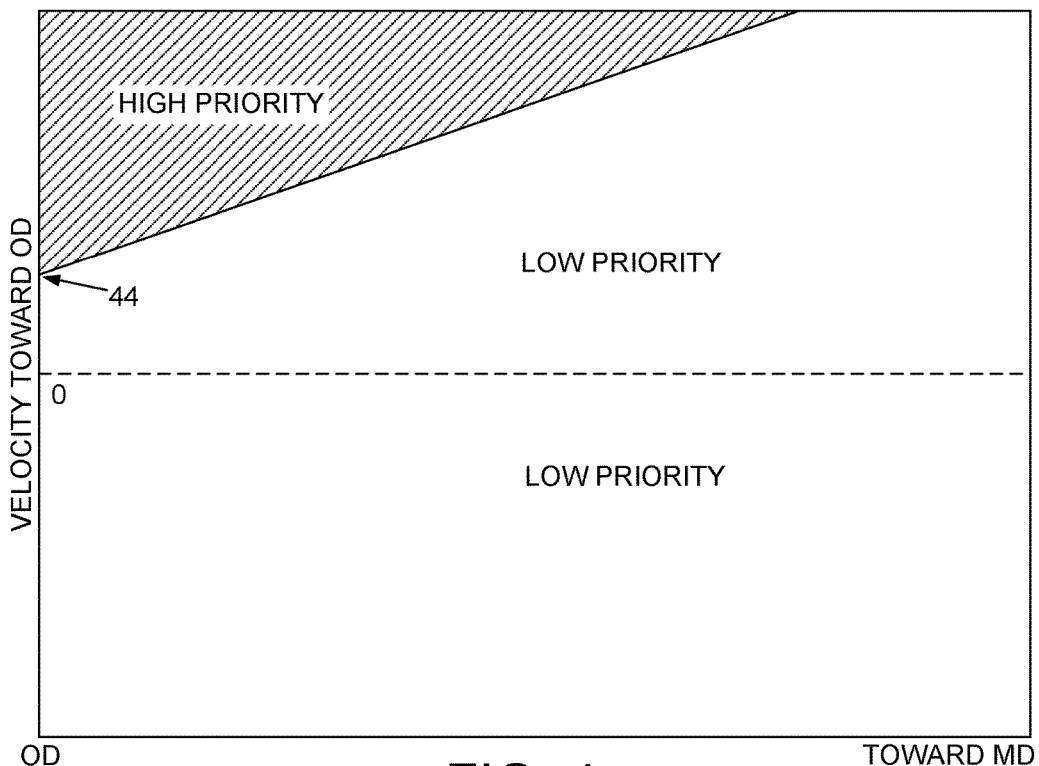
FIG. 4 show an embodiment wherein a VCM may be considered high priority during a power failure when its initial position is proximate a ramp at the outer diameter of the disk and is moving at a high velocity toward the ramp.

FIG. 4 show an embodiment wherein a VCM may be considered high priority during a power failure when its initial position is proximate a ramp at the outer diameter of the disk and is moving at a high velocity toward the ramp. FIG. 4 represents a velocity/position plane wherein the Y-axis represents the initial velocity of the head toward the OD of the disk (toward the ramp 44) and the X-axis represents the initial position of the head at the beginning of a power failure. The dashed line at the middle of the Y-axis represents zero velocity of the head, wherein negative velocity represents the head moving toward the middle diameter (MD) of the disk. In this embodiment, when the initial velocity and position of the head are within the shaded region of FIG. 4, the corresponding VCM is considered high priority and braked immediately to prevent the head from contacting the ramp at an excessive velocity. When the initial position and velocity of the head are outside of the shaded region, the corresponding VCM is considered low priority since the velocity is sufficiently low (or negative) and/or the head is not proximate the OD of the disk. In one embodiment, there is a relatively low probability that the initial velocity and position of both heads will fall within the shaded region of FIG. 4, and so one or both of the VCMs will likely be considered low priority.

In one embodiment, when both the initial velocity and position of the heads fall within the shaded region of FIG. 4 such that both VCMs are considered high priority, then a strong brake voltage may be applied immediately to both VCMs in order to slow the velocity of each head as much as possible. In this embodiment, the BEMF voltage of the spindle motor may not provide sufficient braking power to sufficiently slow both VCMs, and so one or both of the heads may contact the ramp at an excessive velocity. However, the excessive velocity ramp contact event occurs relatively infrequently since again there is a relatively low probability that the initial velocity and position of both heads will fall within the shaded region of FIG. 4 at the beginning of a power failure. If a strong brake voltage were immediately applied to both VCMs regardless as to high/low priority, the excessive velocity ramp contact event would occur more frequently since the probability is higher that the initial velocity and position of one of the heads would fall within the shaded region of FIG. 4.

Figure 5:
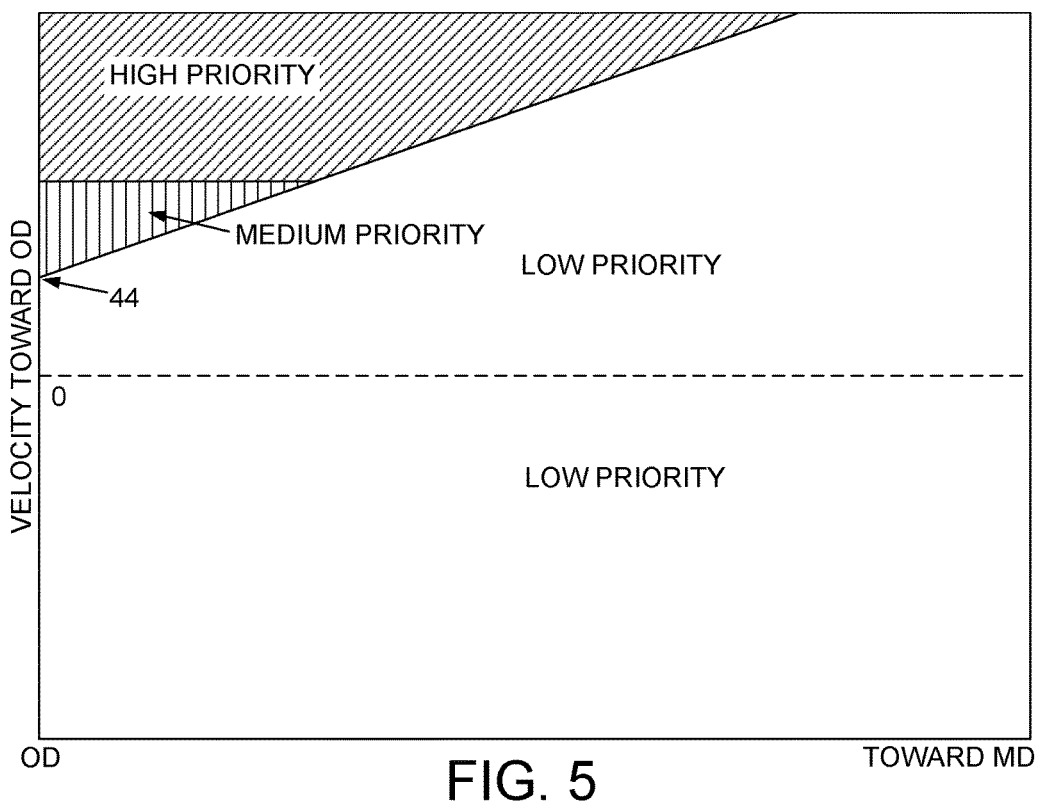
FIG. 5 shows an embodiment wherein a VCM is considered medium priority when its initial velocity is below a threshold and the initial position is proximate the ramp, wherein an immediate, but lower amplitude brake voltage is applied to a medium priority VCM.

FIG. 5 shows an embodiment wherein a region defined by the VCM velocity/position at the beginning of a power failure may be considered a medium priority due its lower velocity when proximate the OD of the disk. In one embodiment, at the beginning of a power failure a strong brake voltage may be applied to a high priority VCM, a medium brake voltage may be applied to a medium priority VCM, and a low brake voltage (e.g., zero voltage) may be applied to a low priority VCM. In this manner when there is a high priority and medium priority VCM, the velocity of both VCMs may be reduced before contracting the ramp, even though the ramp contact velocity may still be higher than a target velocity due to the limited braking power of the spindle BEMF voltage.

Figure 6:
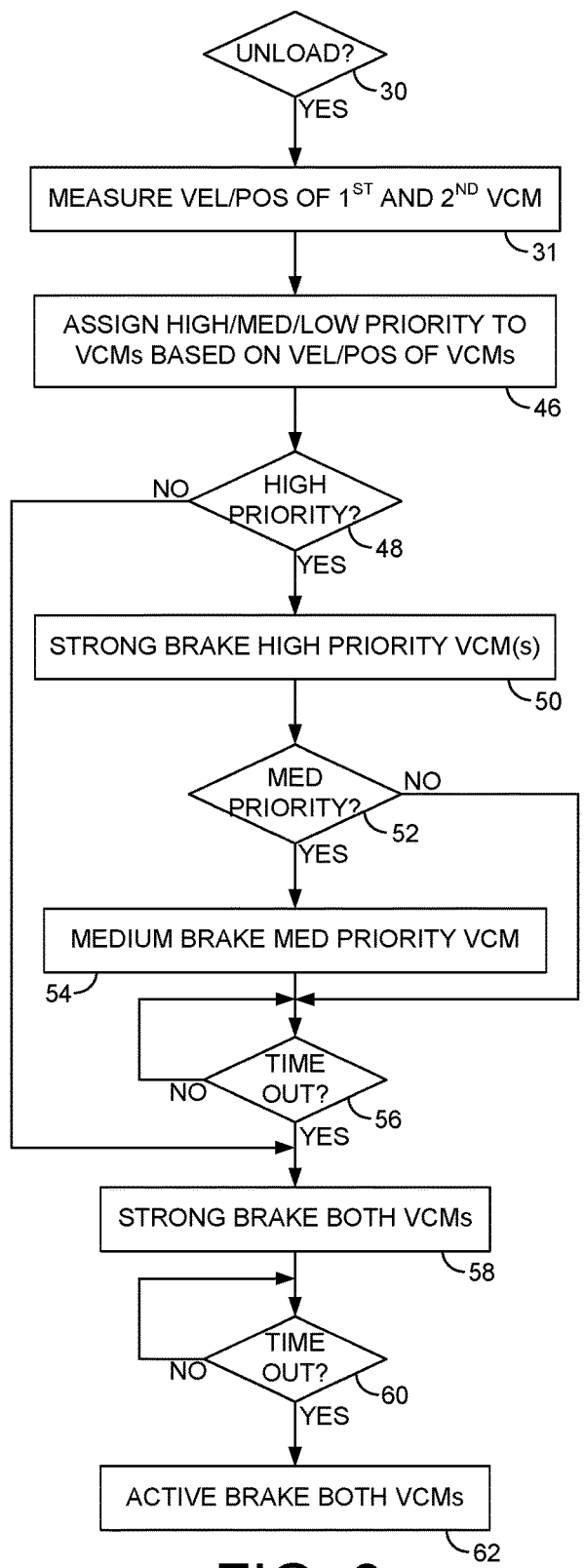
FIG. 6 is a flow diagram according to an embodiment wherein high priority VCMs and medium priority VCMs are immediately braked open loop for a first interval, all of the VCMs are power braked open loop for a second interval, and then all of the VCMs are active braked closed loop.

FIG. 6 is a flow diagram according to an embodiment wherein during a power failure a priority level (high/medium/low) is assigned to each VCM based on the measured velocity and position of each VCM (block 46). When one or both of the VCMs are high priority (block 48), a strong brake voltage is applied to the high priority VCM(s) (block 50). When one of the VCMs is high priority and the other VCM is medium priority (block 52), a medium brake voltage is applied to the medium priority VCM (block 54). After a delay interval (block 56), a strong brake voltage is applied to both VCMs (block 58). If neither of the VCMs is high priority at block (48), a strong brake voltage is applied to both VCMs (block 58). In one embodiment, the strong brake voltage may be applied to both VCMs at block 58 for a predetermined strong brake interval (block 60), wherein in one embodiment the strong brake interval may be configured based on the braking requirements of each VCM (i.e., based on the velocity and position of each VCM). At the end of the strong brake interval, the control circuitry transitions into an active brake mode (block 62), wherein braking of the VCM is controlled closed loop with the measured velocity of the VCMs as feedback. At the end of the active brake mode, the control circuitry may transition into a servo control mode wherein the velocity of each VCM may be maintained at a target velocity using the measured velocity as feedback.

Figure 7:
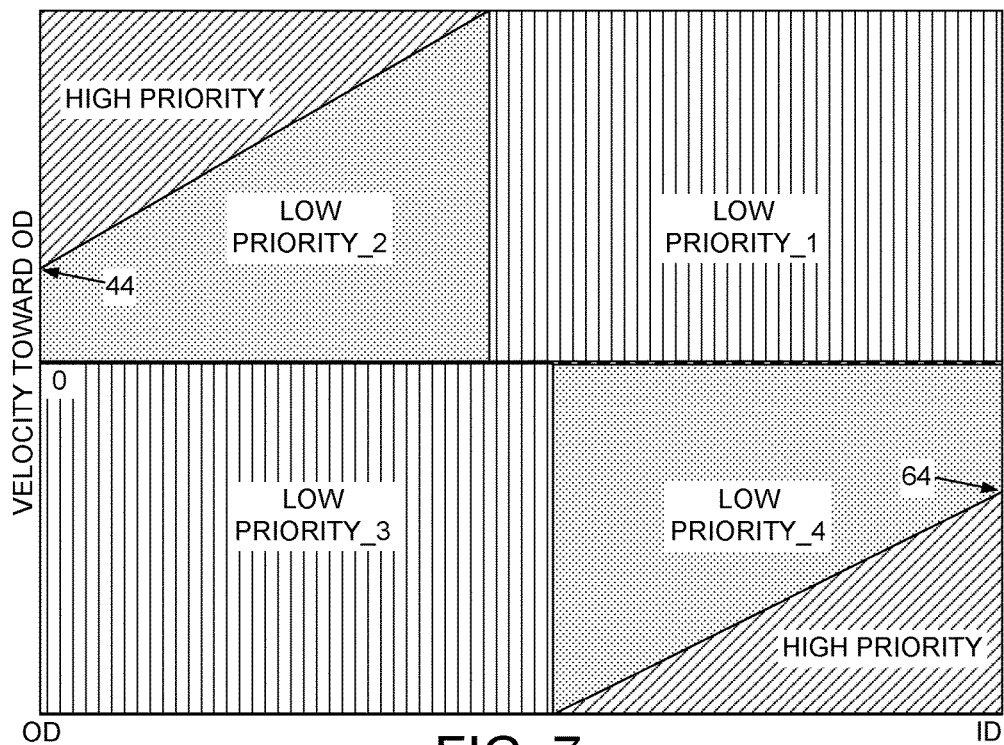
FIG. 7 shows an embodiment wherein a VCM may be considered high priority when its initial position is proximate an inner diameter crash stop and moving at a high velocity toward the crash stop.

FIG. 7 shows an embodiment wherein a VCM may be considered high priority when its initial position is proximate an inner diameter (ID) crash stop 64 and moving at a high velocity toward the ID crash stop 64. In one embodiment, the ID crash stop 64 is implemented as a tab (not shown) extending from the voice coil housing which contacts a physical barrier, thereby limiting the stroke of the VCM to prevent the head from crashing into the disk clamp at the ID of the disk. If the tab contacts the physical barrier at an excessive velocity, the resulting vibration along the actuator arm can damage the head over time. Accordingly, in the embodiment of FIG. 7 a region may be defined in the velocity/position plane where a VCM may be considered as a high priority VCM because it is proximate the ID crash stop and moving toward the ID crash stop at an excessive velocity.

Also in the embodiment of FIG. 7 there are four regions within the velocity/position plane that are considered low priority. In the first and third low priority regions, the initial velocity of the VCM is unconstrained (can reach the maximum possible velocity) since the initial position is far enough away from the ramp 44 and the ID crash stop 64. In the second and fourth low priority regions, both the initial velocity and position of the VCM establish whether the VCM is considered to be a low priority or high priority VCM.

Figure 8:
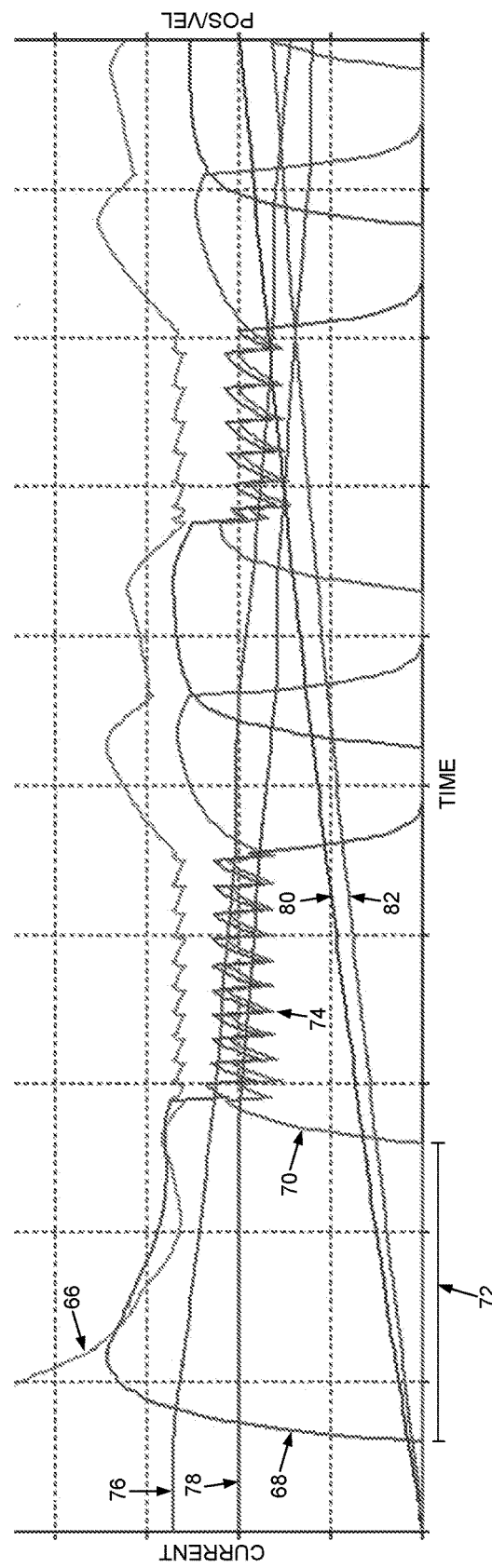
FIG. 8 shows waveforms representing the position/velocity of a high and a low priority VCM, and the VCM driving currents during at least part of an unload operation according to an embodiment.

FIG. 8 shows waveforms representing the position/velocity of a high and a low priority VCM, and the VCM driving currents during at least part of an unload operation according to an embodiment. In FIG. 8, waveform 66 represents a supply voltage received from the host, wherein when the supply voltage falls below a first threshold during a power failure, the spindle BEMF voltage augments or replaces the supply voltage. Waveform 68 represents the VCM driving current for the high priority VCM, and waveform 70 represents the VCM driving current for the low priority VCM. When the power failure occurs, a strong brake voltage is immediately applied to the high priority VCM, and after a delay interval 72, the strong brake voltage is applied to both the high priority and low priority VCMs. In the embodiment of FIG. 8 when the spindle BEMF voltage falls below a second, lower threshold, the voice coils of both VCMs are tristated or shorted to allow the BEMF voltage to recover. This results in the sawtooth waveforms 74 in the BEMF voltage and the VCM driving currents as shown in FIG. 8.

Waveform 76 in FIG. 8 represents the velocity of the high priority VCM, waveform 78 represents the velocity of the low priority VCM, waveform 80 represents the position (distance traveled) of the high priority VCM, and waveform 82 represents the position (distance traveled) of the low priority VCM. In the example of FIG. 8, the velocity of both VCMs is toward the OD of the disk, and the initial position of both VCMs when the power failure occurs is the same. FIG. 8 illustrates how delaying the strong brake of the low priority VCM by a suitable delay interval decreases the velocity of both VCMs to a sufficiently low level to prevent damaging the heads when contacting the ramp.

Any suitable delay interval 72 may be employed in the above-described embodiments. In one embodiment, the delay interval 72 may be a fixed interval, and in another embodiment the delay interval 72 may be configurable based on the relative initial velocity and/or position of the VCMs at the beginning of a power failure. For example, in one embodiment the delay interval 72 may be increased proportional to the velocity/position of the high priority VCM at the beginning of the power failure. In yet another embodiment, the delay interval may be adjusted dynamically based on the measured velocity of the VCM(s) during the unload operation. That is, the velocity of the high priority VCM may be measured during the delay interval wherein the end of the delay interval may be triggered when the velocity falls below a threshold, or when a difference between the VCM velocities falls below a threshold.

In the above-described embodiments, a power failure may be detected in any suitable manner, such as by detecting when the supply voltage received from a host falls below a predetermined threshold. In one embodiment, a power failure may be detected when the supply voltage remains below the threshold for a predetermined interval in order to filter out transients in the supply voltage not due to a power failure. The control circuitry 28 may implement any suitable servo control algorithm in order to execute the unload operation during a power failure. For example, the control circuitry 28 may implement a suitable proportional control, proportional-integral control, or proportional-integral-derivative control. In addition, the control circuitry 28 may change the control algorithm at different intervals of the unload operation, for example, by employing a proportional control while accelerating the VCMs toward a target velocity at the beginning of the unload operation, and then employing a proportional-integral control to maintain the VCMs at the target velocity until the heads are unloaded onto the ramp.

In the above-described embodiments, the initial velocity and position of each VCM may be measured in any suitable manner at the beginning of a power failure. In one embodiment, the control circuitry may comprise a suitable servo control system for actuating the head over the disk during normal access operations, wherein the servo control algorithm may involve measuring the velocity and/or position of each VCM based on servo sectors recorded on each disk surface. When a power failure occurs, the control circuitry may evaluate the servo control states (velocity and/or position) in order to determine the initial velocity and/or position of each VCM. In another embodiment, when a power failure occurs the control circuitry may measure the velocity of each VCM by evaluating the amplitude of a BEMF voltage across each voice coil which is typically proportional to the VCM velocity.

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry may comprise a disk controller responsible for implementing the servo control algorithm used to actuate each head over their respective disk surface during access operations. When a power failure occurs, in one embodiment the disk controller may transmit the state information (velocity and position) of each VCM to a power integrated circuit responsible for braking the VCMs as described above. In another embodiment, the control circuitry may comprise a separate disk controller for controlling a respective VCM during normal access operations, and a separate power integrated circuit for braking a respective VCM during a power failure.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a first voice coil motor (VCM) comprising a first voice coil configured to actuate a first head over a first disk;
a second VCM comprising a second voice coil configured to actuate a second head over a second disk;
a spindle motor configured to rotate the first and second disk, wherein during a power failure the first and second disks rotating causes the spindle motor to generate a back electromotive force (BEMF) voltage; and
control circuitry configured to unload the first VCM and the second VCM during the power failure by at least:
measuring a first velocity and a first position of the first VCM;
measuring a second velocity and a second position of the second VCM;
assigning a high priority to one of the VCMs and a low priority to one of the VCMs based on the first velocity, first position, second velocity and second position;
during a delay interval, using the BEMF voltage to apply a first brake voltage to the voice coil of the high priority VCM and to apply a second brake voltage to the voice coil of the low priority VCM, wherein the second brake voltage is lower than the first brake voltage; and
after the delay interval, using the BEMF voltage to apply the first brake voltage to the voice coil of the high priority VCM and to apply a third brake voltage to the voice coil of the low priority VCM, wherein the third brake voltage is higher than the second brake voltage.

2. The data storage device as recited in claim 1, wherein the third brake voltage equals the first brake voltage.

3. The data storage device as recited in claim 1, wherein the second brake voltage is in the range of zero and 40 percent of the first brake voltage.

4. The data storage device as recited in claim 3, wherein the third brake voltage is in the range of 50 and 100 percent of the first brake voltage.

5. The data storage device as recited in claim 1, wherein the high priority is assigned to the first VCM when:
the first velocity is within a predetermined range;
the first velocity moves the first head toward an outer diameter of the first disk; and
the first position is proximate the outer diameter of the first disk.

6. The data storage device as recited in claim 1, wherein the high priority is assigned to the first VCM when:
the first velocity is within a predetermined range;
the first velocity moves the first head toward an inner diameter of the first disk; and
the first position is proximate the inner diameter of the first disk.

7. The data storage device as recited in claim 1, wherein the low priority is assigned to the second VCM when:
the second velocity moves the second head toward an outer diameter of the second disk;
the second velocity is within a first predetermined range; and
the second head is not proximate the outer diameter of the second disk.

8. The data storage device as recited in claim 7, wherein the low priority is assigned to the second VCM when:
the second velocity is within a second predetermined range; and
the second head is proximate the outer diameter of the second disk.

9. The data storage device as recited in claim 1, wherein the low priority is assigned to the second VCM when:
the second velocity moves the second head toward an inner diameter of the second disk;
the second velocity is within a first predetermined range; and
the second head is not proximate the inner diameter of the second disk.

10. The data storage device as recited in claim 9, wherein the low priority is assigned to the second VCM when:

the second velocity is within a second predetermined range; and the second head is proximate the inner diameter of the second disk.

11. A method of operating a data storage device by unloading multiple voice coil motors (VCMs) during a power failure, the method comprising:
   measuring a first velocity and a first position of a first VCM comprising a first voice coil configured to actuate a first head over a first disk;
   measuring a second velocity and a second position of a second VCM comprising a second voice coil configured to actuate a second head over a second disk;
   assigning a high priority to one of the VCMs and a low priority to one of the VCMs based on the first velocity, first position, second velocity and second position;
   during a delay interval, using the BEMF voltage to apply a first brake voltage to the voice coil of the high priority VCM and to apply a second brake voltage to the voice coil of the low priority VCM, wherein the second brake voltage is lower than the first brake voltage; and
   after the delay interval, using the BEMF voltage to apply the first brake voltage to the voice coil of the high priority VCM and to apply a third brake voltage to the voice coil of the low priority VCM, wherein the third brake voltage is higher than the second brake voltage.

12. The method as recited in claim 11, wherein the third brake voltage equals the first brake voltage.

13. The method as recited in claim 11, wherein the second brake voltage is in the range of zero and 40 percent of the first brake voltage.

14. The method as recited in claim 13, wherein the third brake voltage is in the range of 50 and 100 percent of the first brake voltage.

15. The method as recited in claim 11, wherein the high priority is assigned to the first VCM when:
   the first velocity is within a predetermined range;
   the first velocity moves the first head toward an outer diameter of the first disk; and
   the first position is proximate the outer diameter of the first disk.

16. The method as recited in claim 11, wherein the high priority is assigned to the first VCM when:
   the first velocity is within a predetermined range;
   the first velocity moves the first head toward an inner diameter of the first disk; and
   the first position is proximate the inner diameter of the first disk.

17. The method as recited in claim 11, wherein the low priority is assigned to the second VCM when:
   the second velocity moves the second head toward an outer diameter of the second disk;
   the second velocity is within a first predetermined range; and
   the second head is not proximate the outer diameter of the second disk.

18. The method as recited in claim 17, wherein the low priority is assigned to the second VCM when:
   the second velocity is within a second predetermined range; and
   the second head is proximate the outer diameter of the second disk.

19. The method as recited in claim 11, wherein the low priority is assigned to the second VCM when:
   the second velocity moves the second head toward an inner diameter of the second disk;
   the second velocity is within a first predetermined range; and
   the second head is not proximate the inner diameter of the second disk.

20. The method as recited in claim 19, wherein the low priority is assigned to the second VCM when:
   the second velocity is within a second predetermined range; and
   the second head is proximate the inner diameter of the second disk.

* * * * *